United States Patent
Levine

(10) Patent No.: US 6,388,427 B1
(45) Date of Patent: May 14, 2002

(54) BATTERY TEMPERATURE DERIVATIVE CHARGING

(75) Inventor: Erik L. Levine, San Jose, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/950,445

(22) Filed: Sep. 10, 2001

(51) Int. Cl.$^7$ .................................................. H02J 7/14
(52) U.S. Cl. ........................................................ 320/151
(58) Field of Search .............................. 320/150, 151, 320/152, 153; 429/61, 90, 49, 50, 52

(56) References Cited

U.S. PATENT DOCUMENTS

| | | | | |
|---|---|---|---|---|
| 4,680,241 A | * | 7/1987 | Dyer ............................ | 320/128 |
| 5,395,706 A | * | 3/1995 | Hall ............................. | 320/134 |
| 5,705,915 A | * | 1/1998 | Douglas et al. .............. | 320/152 |
| 6,211,655 B1 | * | 4/2001 | Hardie ......................... | 320/150 |
| 6,246,217 B1 | * | 6/2001 | Yoshida et al. .............. | 320/150 |
| 2001/0001533 A1 | * | 5/2001 | Anderson et al. ........... | 320/150 |

* cited by examiner

Primary Examiner—Gregory Toatley
(74) Attorney, Agent, or Firm—Perman & Green, LLP

(57) ABSTRACT

A method of charging a nickel-hydrogen battery which includes a positive electrode, a negative electrode and an electrolyte, after the battery has been subject to discharge is disclosed the method comprising the steps of: (a) subjecting the battery to a high charge rate for a period until the battery temperature increases at least $\Delta T_1$ over the local minimum battery temperature; (b) switching the battery charge level to a lower rate of charge than in step (a) for a period until the battery temperature increases at least $\Delta T_2$ over the local minimum battery temperature; (c) switching the battery charge level to a much lower rate of charge than step (b) for a period up to about 30 to 60 minutes before the next scheduled eclipse; and thereafter (d) switching the battery to a pulse charge equivalent to the high charge rate of step (a).

11 Claims, 3 Drawing Sheets

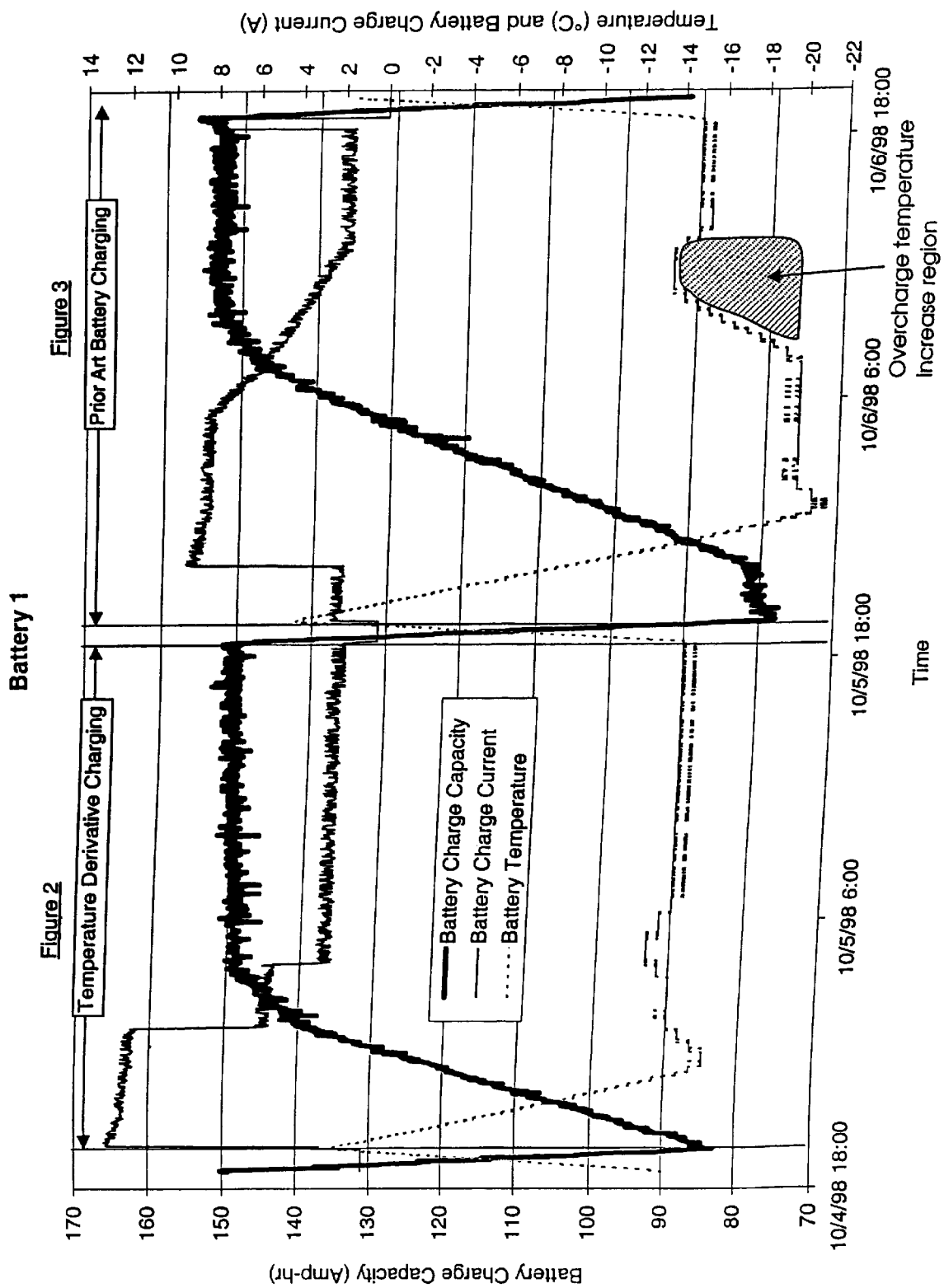

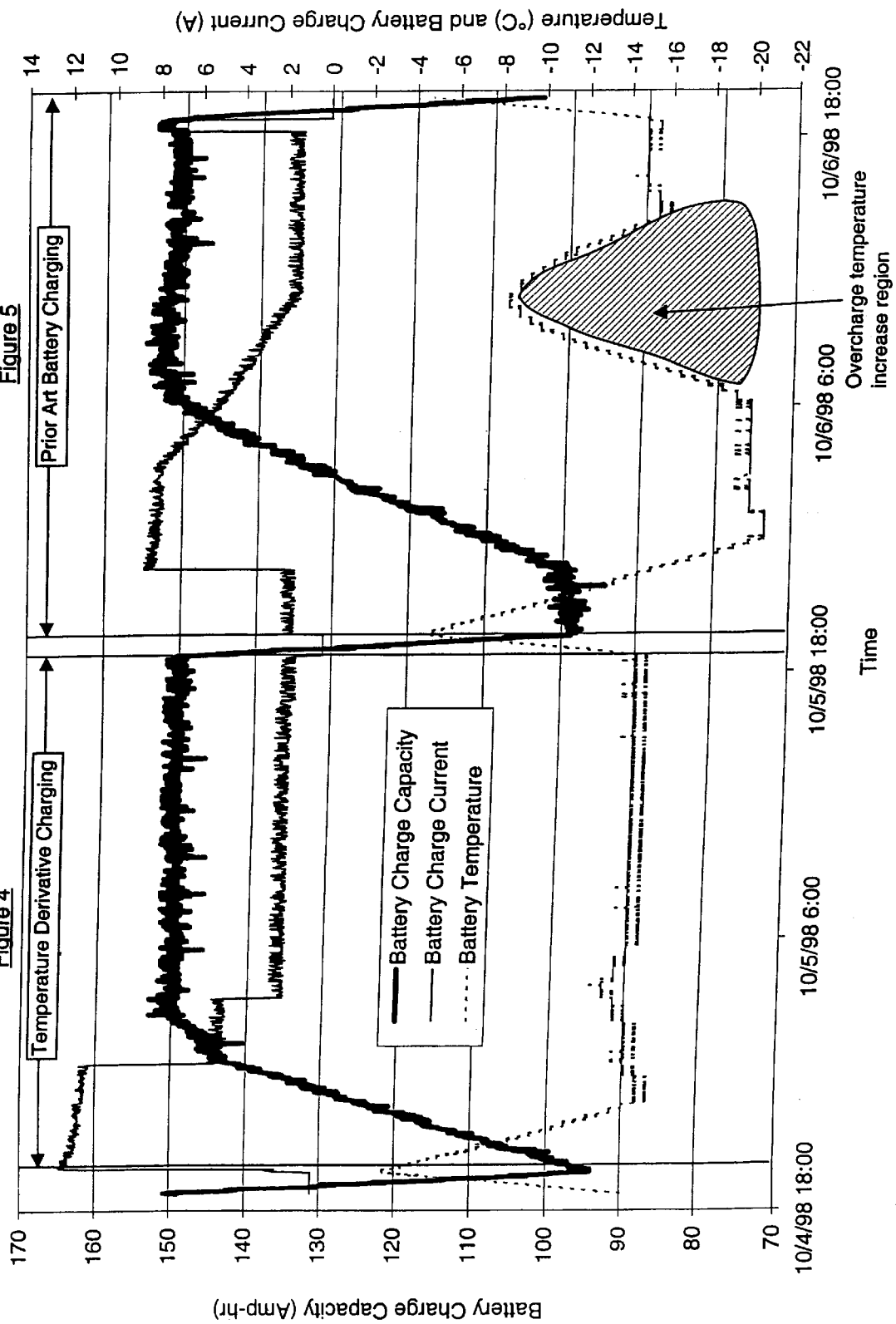

BATTERY TEMPERATURE DERIVATIVE CHARGING

BACKGROUND OF THE INVENTION

1. Field of the Invention

The present invention relates generally to a method for charging a nickel-hydrogen battery, and, more particularly, to an improved method for the "cold charging" of nickel-hydrogen batteries as typically used in a spacecraft, by providing a closed loop control for charge control of the battery to minimize battery heat dissipation and spacecraft power requirements, and to maximize battery charge capacity.

2. Description of the Prior Art

It is well recognized that optimum performance for nickel hydrogen spacecraft batteries requires that their temperature during charging be controlled in the range of $-20°$ C. to $+10°$ C. Higher temperatures generally lead to lowered stored energy capacity due to the early on-set of the parasitic electrolysis reaction, e.g.,

$$2OH^- = \tfrac{1}{2}O_2 + H_2O + 2e^- \quad (1)$$

Reaction (1) has been recognized in the prior art to reduce capacity as the operating temperature during charging of the battery is increased. In U.S. Pat. No. 5,395,706 there is described information about the recognition of critical temperatures for charging a Ni—$H_2$ battery. The content of U.S. Pat. 5,395,706 is incorporated by reference into this application. The recognition is that the critical temperature is that at which the battery is recharged and reaction (1) competes with the normal recharge reaction, e.g.,

$$Ni(OH)_2 + OH^- \xrightarrow{-NiOOH + H} {}_2O + e^- \quad (2)$$

The '706 patent provides for the basis to optimally charge nickel-hydrogen batteries "at a temperature $T_1$ in the range of $-10°$ C. down to $-30°$ C., which is lower than a temperature $T_2$, in the range of $-10°$ C. up to $+5°$ C. at which discharge customarily begins." Lower temperatures on the other hand have been found to lead to batteries which fail to operate. The reasons for this failure, prior to the invention, described in U.S. Pat. No. 5,395,706, were unclear as the freezing point of the electrolyte ($-61°$ C.) is well below the minimum operation temperature. The second key to the invention in U.S. Pat. No. 5,395,706 is the recognition that the lower temperature limit is due to a limitation in the ability of the battery to sustain high rate discharge required in satellites situated in a geosynchronous orbit (e.g. ~C/1.5) as opposed to the lower rate recharge (e.g. ~C/10)-where "C" is a baseline, or nameplate, capacity of the battery.

A typical example of the prior art as it relates to charging and discharging nickel type batteries is U.S. Pat. No. 4,680,241 to Dyer. The Dyer patent concerns a method for partially or fully restoring the lost capacities of nickel batteries. In this instance, a nickel battery is cycled at least ten (10) times, with each cycle including a discharging step during which the capacity achieved at the end of the previous cycle is reduced by at least five (5) percent, and a charging step. The charging rate employed during the charging step is greater than about C/10 per hour. Moreover, while the ratio of the amount of charge delivered to the battery during the charging step of each cycle to the amount of charge withdrawn from the battery during the previous cycle is greater than one, this ratio is chosen so that the temperature of the electrolyte of the battery does not exceed about $30°$ C.

SUMMARY OF THE INVENTION

The present invention adds to the prior art a method for the prevention of overcharging which leads to lower battery charge capacity and an inefficient use of spacecraft power. Programming requirements are much simpler for the present invention than that described by the prior art. Battery recharge is adjusted to account for battery recharge performance in a closed loop control as opposed to the prior art which is an open loop charge control. The method according to the present invention lends itself to easy application to recharging a battery after all battery discharges, including those caused by nominal earth eclipse periods, as experienced by spacecraft, and non-nominal discharges such as in the case of lunar eclipses, spacecraft emergencies, spacecraft orbital maneuvers, etc.

The features of the present invention provide for a closed loop feed back control of battery charging based upon battery heat dissipation through direct measurement of battery temperature (and/or direct measurement of battery heater duty cycles or battery strain gage data which is a direct measurement of battery pressure which is itself an indirect measurement of temperature at a given state of charge). The features of the present invention allows for automated battery recharge in eclipse and non-eclipse discharge cycles (such as orbit raising, lunar eclipse, and emergency operations).

To achieve the various advantages described herein in accordance with the purpose of this invention, the inventive features as embodied by the present invention include a method of charging a nickel-hydrogen battery which includes a positive electrode, a negative electrode, and an electrolyte, after the battery has been subject to discharge, comprising the steps of: (a) subjecting the battery to a high charge rate (e.g. about C/10 to C/15-wherein "C" is the normal full baseline or nameplate capacity of the battery) for a period until the battery temperature increases at least a set $\Delta T_1$ (typically about $2°$ C.) over the local minimum battery temperature i.e., the lowest temperature, during this initial charge, (b) switching the battery charge level to a lower rate of charge than in step (a) for a period until the battery temperature increases at least $\Delta T_2$ (typically the same as $\Delta T_1$ i.e., $2°$ C.) over the local minimum battery temperature; (c) again switching the battery charge level to a minimum charge rate of approximately C/100 up and until about 30 to about 60 minutes before the next scheduled eclipse and thereafter; (d) switching the battery to a pulse charge equivalent to the high charge rate of step (a) until the next eclipse begins, or switching back to the minimum charge rate in step (c) after a maximum of 60 minutes of charge during step (d), i.e. no further battery discharge commences. Thus, the battery charge rate is closed loop controlled by changes of the battery temperature over time, i.e. temperature derivative.

Furthermore, in accordance with the features of the present invention a method of charging a nickel-hydrogen battery which includes a positive electrode, a negative electrode, and an electrolyte, comprises the steps of: (a) first subjecting the battery to a relatively high charge rate of about C/15 for a period until the battery temperature increases about $2°$ C. over the local minimum battery temperature; (b) switching the battery charge level to a medium level of charge rate of about C/30, for a period until the battery temperature increases about $2°$ C. over the local minimum battery temperature; (c) again switching the battery charge level to a relatively low level of charge of about C/100 for a period up to about 30 to 60 minutes before the next scheduled eclipse; and (d) switching the battery to a pulse charge equivalent to high charge rate of step (a).

According to the features of the present invention, a primary object of the present invention is to obtain an improved unique method for autonomously increasing the capacity of a nickel-hydrogen battery. Due to the unique simplified method for changing, the method can be performed manually, i.e. by ground command, in the event of a failure or absence of the autonomous means within the spacecraft.

Other objects of the present invention are for an improved method for the "cold charging" of nickel-hydrogen batteries include providing a closed loop control for charge control of the battery to minimize battery heat dissipation and spacecraft power requirements.

BRIEF DESCRIPTION OF THE DRAWINGS

The accompanying drawings, which are incorporated in and constitute a part of the specification illustrate one embodiment of the invention and, together with the description herein, serve to explain the principles of the invention.

FIG. 2 is a graph depicting the operation of a first cell of an Ni—$H_2$ battery in accordance with the features of the present invention, presenting various parameters over the course of time;

FIG. 3 is a graph depicting the operation of the same first cell of a Ni—$H_2$ battery presenting various parameters over the course of time illustrating a recharge based upon known methods not including the closed loop control of the recharge, FIG. 4 is a graph depicting the operation of a second cell of a Ni—$H_2$ battery in accordance with the features of the present invention presenting various parameters over the course of time; and FIG. 5 is a graph depicting the operation of the same second cell presenting various parameters over the course of time illustrating a recharge based upon known methods not including the closed loop control of the recharge.

DETAILED DESCRIPTION OF THE PREFERRED EMBODIMENTS

Figure 1:
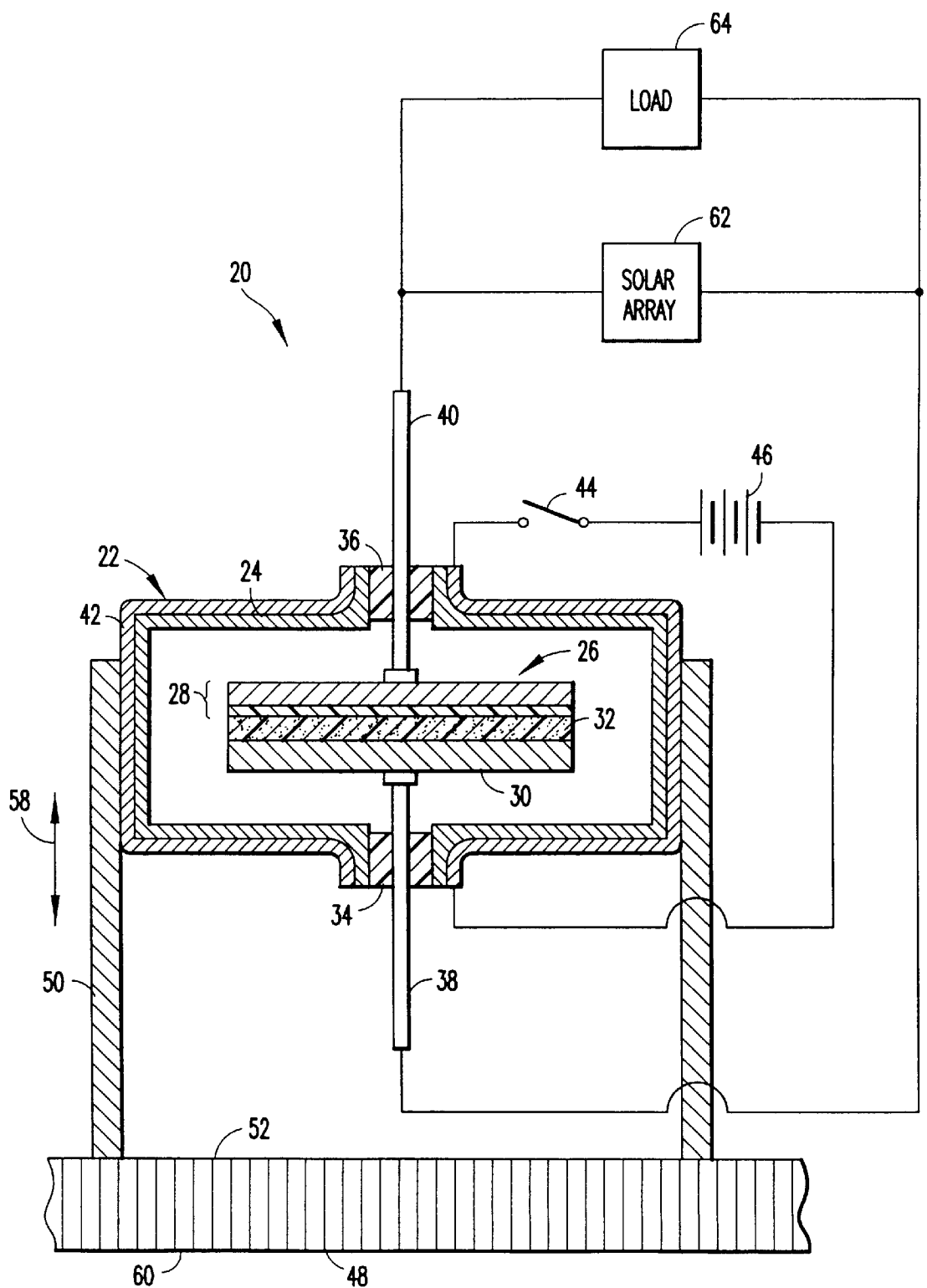
FIG. 1 is a diagrammatic representation of a battery system embodying the present invention and includes a cross sectional view of a cell of a nickel-hydrogen battery used with the battery system.

While the present invention will be described hereinafter in connection with a preferred embodiment thereof, it should be understood that it is not intended to limit the invention to that embodiment. On the contrary, it is intended to cover all alternatives, modifications and equivalents as may be included within the spirit and scope of the invention as defined by the appended claims including the application of the method defined by the present invention on other battery type systems for use in non-GEO type spacecraft, and for use on terrestrial battery systems.

As shown in FIG. 1, a nickel-hydrogen battery system 20 of the type with which the invention is concerned includes a cell 22 provided with a pressure vessel 24 and an electrode stack 26 within the pressure vessel. The electrodes stack 26, in turn, includes a positive electrode 28, a negative electrode 30, and a porous separator 32 which also serves as an electrolyte reservoir for storing excess electrolyte within the electrode stack 26. The porous separator 32 may be composed of zirconia, asbestos, plastic, and the like. The positive electrode 28 includes electrochemically active nickel hydroxide and electrically conductive material having a resistivity less than approximately 0.1 ohm/cm. The negative electrode 30 is of a material which catalyzes the oxidation and reduction of hydrogen gas and, in typical fashion, the electrolyte is a solution of potassium hydroxide (KOH).

The cell 22 also has electrical lead through 34 and 36 through which negative and positive electrical leads 38 and 40 respectively, pass.

A suitable electrically energized heater jacket 42 overlies the pressure vessel 24. By closure of a switch 44, heating elements within the heater jacket 42 can be energized by a suitable source 46 of EMF for heating the cell 22.

The cell 22 is thermally connected to an optical space radiator (OSR) 48 via a thermally conductive sleeve 50. The sleeve 50 is mounted on one side 42 of the OSR 48 and slidably envelops an outer peripheral surface 54 of the cell 22. A side 60 of the OSR 48 opposite side 52 faces black space. The cell is continuously cooled by the OSR and its temperature is determined by bucking the OSR with the heater jacket 42.

On a spacecraft which is the intended venue for the cell 22, a solar array 62 is the primary power source indicated for recharging the cell 22 and a typical load 64 is indicated for the discharge cycle of the cell.

In accordance with the features of the present invention, the terms $T_1$, $\Delta T_1$, $T_2$ and $\Delta T_2$ as used herein are defined as follows:

$T_1$, is defined as the temperature range of approximately −10° C. down to −30° C.

$T_2$ is defined as the temperature range of approximately −10° C. to +5° C.

$\Delta T_1$ and $\Delta T_2$ are typically 2° C.

Battery discharge (either due to an Earth or lunar eclipse, orbit raising activity, emergency condition, etc) is followed by a high rate charge, typically C/15 (where C is the baseline, or nameplate, full charge capacity of the battery). This high rate of charge is maintained until the battery temperature (either measured at a single thermistor location or an average of several locations) increases $\Delta T_1$ over the local minimum battery temperature during the initial charge. The battery charge level is then switched to a lower rate of charge, typically half of the high charge rate (i.e., C/30). This medium charge rate period is terminated when the battery increases $\Delta T_2$ over the local minimum battery temperature during this second charge period. Following this second charge period, the battery charge rate is set to a trickle charge rate of typically C/100. This trickle charge rate is maintained until 30 to 60 minutes before the next scheduled eclipse, at which point the battery is placed under a pulse charge equivalent to the high charge rate. Battery minimum temperature is limited to the $T_1$ per previous art during the first two charge periods (high and medium) via the use of battery heaters, or an increase in the battery charge rates during either or both periods (these increases in charge rate might in turn be updated autonomously or manually). Thereafter, heaters are used to raise the battery to the $T_2$ temperature, consistent with previous known methods.

All parameters (e.g. charge levels, delta temperature switch over values) in this method would be changeable via command memory upload or discrete command.

Non-Earth eclipse discharge cycles would have heater setpoints set to the higher level, $T_2$, throughout the charge period, and pulse charge period would be eliminated.

The graphs illustrated in FIGS. 2–5 are based upon data taken during in orbit testing of a GEO where the technique described in accordance with the features of this invention was used as a method to perform manual battery recharging during an eclipse season. As demonstrated, the method in accordance with the present invention can be very easily performed manually in the event of an emergency situation, in addition to being autonomously controlled via spacecraft hardware and software.

The graphs in FIGS. 2–5 show two in-orbit battery discharge/charge cycles on two different batteries. The first cycle (approximately Oct. 4, 1998 18:00 through approximately Oct. 5, 1998 18:00) as illustrated in FIGS. 2 and 4 is a recharge based on the method in accordance with the specific features of the present invention as described herein. The second cycle (approximately Oct. 5, 1998 18:00 through approximately Oct. 6, 1998 18:00) i.e. FIGS. 3 and 5, is a recharge based on known methods which does not include the closed loop control of the recharge based on battery temperatures. Note that the final full recharged capacity of the two cycles is virtually the same. Also note that the overcharge region resulting in the battery temperature rise in the second cycle is not present in the first cycle. This indicates that the battery charge energy during this portion of the charge period is not being put into battery stored energy but rather into excess waste heat. Instead, this energy can be used by the spacecraft for other purposes. In addition, the battery during the first charge cycle reaches its full state of charge several hours earlier than in the second cycle (with respect to the end of the discharge point).

Note two key differences between these two recharge profiles. The first is that the recharge for the first cycle (the process defined in this invention) is performed at a minimum temperature of –15° C., whereas the minimum temperature of the second recharge cycle (not using the closed loop thermal control of the charge return) i.e. by known methods, is –20° C. Secondly, the first cycle does not include the pulse charge that the second cycle includes. With both of these aspects incorporated into the first cycle, the capacity of the first cycle can be increased by approximately 10 Ahrs, and would therefore exceed the charge acceptance over the second cycle. FIGS. 4–5 is for battery 2 of the spacecraft during the same period. Similar performance is noted on that battery as well by using the method described by the present invention (FIG. 4) as compared by the performance by known methods (i.e. FIG. 5).

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims. It is, however, recognized in accordance with the features of this invention that the charge profile described herein can include more than two charge periods before step (e) as described herein with minimal improving effects.

What is claimed is:

1. A method of charging a nickel-hydrogen battery which includes a positive electrode, a negative electrode, and an electrolyte, after the battery has been subject to discharge, the method comprising the steps of:
   (a) subjecting said battery to a high charge rate for a period until the battery temperature increases at least $\Delta T_1$, where $\Delta T_1$ is about 2° C., over the local minimum battery temperature;
   (b) switching the battery charge level to a lower rate of charge than in step (a) for a period until the battery temperature increases at least $\Delta T_2$, where $\Delta T_2$ is about 2° C., over the local minimum battery temperature;
   (c) switching the battery charge level to a trickle rate which is lower than step (b) for a period up to about 30 to 60 minutes before a next scheduled eclipse; and thereafter
   (d) switching the battery to a pulse charge equivalent to the high charge rate of step (a).

2. A method of charging a nickel-hydrogen battery in accordance with claim 1 wherein the battery minimum temperature is limited during both steps (a) and (b) to a temperature of $T_1$, wherein $T_1$ is a temperature in the range of about –30° C. to –10° C.

3. A method of charging a nickel-hydrogen battery in accordance with claim 1 wherein the battery temperature after step (b) is raised to a temperature of $T_2$, wherein $T_2$ is a temperature in the range of about –10° C. to about +5° C.

4. A method of charging a nickel-hydrogen battery in accordance with claim 1 wherein said high charge rate of step (a) is about C/15, wherein C is the normal baseline or nameplate charge capacity of the battery.

5. A method of charging a nickel-hydrogen battery in accordance with claim 1 wherein the battery charge level of step (b) is about ½ the battery charge level of step (a).

6. A method of charging a nickel-hydrogen battery in accordance with claim 1 wherein the battery charge level of step (b) is about C/30, wherein C is the normal baseline or nameplate charge capacity of the battery.

7. A method of charging a nickel-hydrogen battery in accordance with claim 1 wherein the battery charge level of step (c) is about C/100, wherein C is the normal baseline or nameplate charge capacity of the battery.

8. A method of charging a nickel-hydrogen battery which includes a positive electrode, a negative electrode, and an electrolyte, the method comprising the steps of:
   (a) first subjecting the battery to a relatively high charge rate of about C/15, wherein C is the normal baseline or nameplate charge capacity of the battery for a period until the battery temperature increases about 2° C. over the local minimum battery temperature;
   (b) then switching the battery charge level to a medium level of charge rate of about C/30, wherein C is the normal baseline, or nameplate charge capacity of the battery for a period until the battery temperature increases about 2° C. over the local minimum battery temperature;
   (c) then switching the battery charge level to a low level of charge of about C/100, wherein C is the normal baseline, or nameplate charge capacity of the battery for a period up to about 30 to 60 minutes before a next scheduled eclipse; and
   (d) then switching the battery to a pulse charge equivalent to high charge rate of step (a).

9. A method of charging a nickel-hydrogen battery in accordance with claim 8 wherein the battery minimum temperature is limited during both steps (a) and (b) to a temperature of $T_1$, wherein $T_1$ is a temperature in the range of about –30° C. to about –10° C., and the battery temperature after step (b) is raised to a temperature of $T_2$, wherein $T_2$ is a temperature in the range of about –10° C. to about +5° C.

10. A nickel-hydrogen battery charged by the method of claim 1.

11. A nickel-hydrogen battery charged by the method of claim 9.

* * * * *